United States Patent
Bish et al.

(10) Patent No.: US 7,379,988 B2
(45) Date of Patent: May 27, 2008

(54) AUTONOMIC PERFORMANCE TUNING OF A DISTRIBUTED VIRTUAL STORAGE SERVER

(75) Inventors: Thomas W. Bish, Tucson, AZ (US); Mark A. Reid, Castle Way, AZ (US); Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1047 days.

(21) Appl. No.: 10/422,467

(22) Filed: Apr. 23, 2003

(65) Prior Publication Data
US 2004/0215713 A1   Oct. 28, 2004

(51) Int. Cl.
*G06F 15/16* (2006.01)
(52) U.S. Cl. ............ 709/223; 709/222; 709/224; 709/227
(58) Field of Classification Search ........ 709/213–216, 709/223, 224, 227–228, 220, 222
See application file for complete search history.

(56) References Cited

U.S. PATENT DOCUMENTS

| | | | |
|---|---|---|---|
| 5,530,845 A * | 6/1996 | Hiatt et al. ............... | 703/27 |
| 5,602,991 A | 2/1997 | Berteau | |
| 5,790,886 A | 8/1998 | Allen | |
| 5,922,056 A | 7/1999 | Amell et al. | |
| 6,115,752 A | 9/2000 | Chauhan | |
| 6,185,619 B1 * | 2/2001 | Joffe et al. ............... | 709/229 |
| 6,434,637 B1 * | 8/2002 | D'Errico ............... | 710/38 |
| 6,477,582 B1 | 11/2002 | Luo et al. | |
| 6,629,156 B1 * | 9/2003 | Odenwald et al. ............... | 710/8 |
| 7,222,166 B2 * | 5/2007 | Treister et al. ............... | 709/223 |
| 2002/0004883 A1 | 1/2002 | Nguyen et al. | |
| 2002/0099818 A1 * | 7/2002 | Russell et al. ............... | 709/224 |
| 2002/0133532 A1 | 9/2002 | Hossain | |
| 2002/0133593 A1 | 9/2002 | Johnson et al. | |
| 2003/0065871 A1 * | 4/2003 | Casper et al. ............... | 710/316 |
| 2003/0149755 A1 * | 8/2003 | Sadot ............... | 709/223 |

OTHER PUBLICATIONS

Stigliani, "IBM eServer z900 I/O subsystem", IBM Journal of Research and Development, Jul.-Sep. 2002, vol. 46, No. 4-5, p. 421-45, teaches an IBM server that supports ESCON/FICON.*

* cited by examiner

*Primary Examiner*—Krisna Lim
*Assistant Examiner*—Brendan Y. Higa
(74) *Attorney, Agent, or Firm*—Dan Shifrin

(57) ABSTRACT

A dynamic selection of a communications link between a storage controller and one of a plurality of storage servers is provided so as to enhance the performance of the storage system. The storage system includes a plurality of storage devices, a corresponding plurality of virtual storage controllers coupled to the storage devices and a virtual storage controller. The virtual storage controller includes a host interface, a server interface, a stored table and a processing unit. The stored table includes a list identifying the active links between the server interface and each virtual storage server and, for each active link, a corresponding performance value. The processing unit is programmed to receive from a host a request for a storage operation on selected data, determine which active link has the most favorable performance value and direct that the requested storage operation be performed by the virtual storage server coupled to the virtual storage controller over the active link having the most favorable performance value.

17 Claims, 2 Drawing Sheets

AUTONOMIC PERFORMANCE TUNING OF A DISTRIBUTED VIRTUAL STORAGE SERVER

TECHNICAL FIELD

The present invention relates generally to the field of computer data storage systems and, in particular, to the dynamic selection of a communications link between a storage controller and one of a plurality of storage servers so as to enhance the performance of the storage system.

BACKGROUND ART

Early computer data storage systems included one host device, one storage device (such as a hard disk drive, tape drive or an optical drive) and a storage controller to manage the transfer of data between the host and the storage device. The use of a single storage device eventually evolved into consolidating several storage devices (such as tape drives) into an automated library and many (sometimes hundreds or even thousands) of pieces of media (such as tape cartridges) retrievable by mechanical means for loading into one of the storage devices. More recent innovations permit more than one storage library to be attached to a host (or to more than one host) through a storage controller and multiple storage servers in such a fashion so as to be transparent to the host. Thus, regardless of the physical configuration of a storage system, the host logically "sees" only a single storage device through a single storage server. The storage servers in such a system are referred to as "virtual" storage servers (virtual tape servers in the case of tape-based systems) and the storage controllers are referred to as "virtual" storage controllers (virtual tape controllers in the case of tape-based systems).

Even more recently, IBM Corporation has developed a "Peer-to-Peer Virtual Tape Server". Two (or possibly more) virtual tape server (VTSs) may be geographically separated (although they are not required to be) and are connectable to an S/390® host processor through a virtual tape controller ("VTC"), such as an IBM® Model AXO. VTC to VTS connections may be over enterprise system connection (ESCON®) or fiber connection (FICON TM) communication links, with or without channel extenders.

In a typical operation, a host sends a request to the controller for access to particular stored data. If the data resides in a server cache, the read or write operation is performed using the cached data. Otherwise, the data is retrieved from the storage device by the server and then the operation is performed.

Performance may degrade as the distance between the VTC and a VTS (and its corresponding library) increases. Therefore, when the distances from the VTC to one VTS is significantly greater than the distance to another VTS, it may be desirable to establish a preference for the closer VTS and library in an attempt to maximize performance. Data operations will be sent to the preferred VTS by default, absent the existence of other considerations, such as a backlog in the preferred server.

Each link between the VTC and a VTS may be characterized by the type of communications link connecting the two, the presence and type of any extender and the length of the link. The performance of a link is affected by each of these factors. For example, an ESCON link which is five kilometers (5 km) long will be faster than an ESCON link which is ten kilometers (10 km) long, other factors being equal. However, if the requested data resides in cache in the VTS attached through the longer link, the actual operation time may be faster through the VTS which is farther away from the VTC than if the data must be retrieved into the other, closer link.

Finally, during normal operations a closer VTS may have accumulated a backlog of host job requests and consequently that VTS may take longer to fulfill new requests than one which is farther from the VTC but has less of a backlog, regardless of the state of the cache.

Thus, there are significant interrelated variables which affect the overall performance of the storage system and there remains a need for improved workload allocation among storage servers in a storage system.

SUMMARY OF THE INVENTION

The present invention provides a storage system comprising a plurality of storage devices, a corresponding plurality of virtual storage controllers coupled to the storage devices and a virtual storage controller. The virtual storage controller comprises a host interface, a server interface, a stored table and a processing unit. The stored table comprises a list identifying the active links between the server interface and each virtual storage server and, for each active link, a corresponding performance value. The processing unit is programmed to receive from a host a request for a storage operation on selected data, determine which active link has the most favorable performance value and direct that the requested storage operation be performed by the virtual storage server coupled to the virtual storage controller over the active link having the most favorable performance value.

In one embodiment, the performance values are determined by the distance of an link between the server interface and a virtual storage server and the type of link. For example, faster links (such as FICON) are assigned more favorable weighting than slower links (such as ESCON) and shorter links are assigned more favorable weighting than longer links and the combination determines the performance value of the link. Other characteristics, such as availability of requested data in cache, may influence the performance value as well.

DETAILED DESCRIPTION OF THE PREFERRED EMBODIMENT

Figure 1:
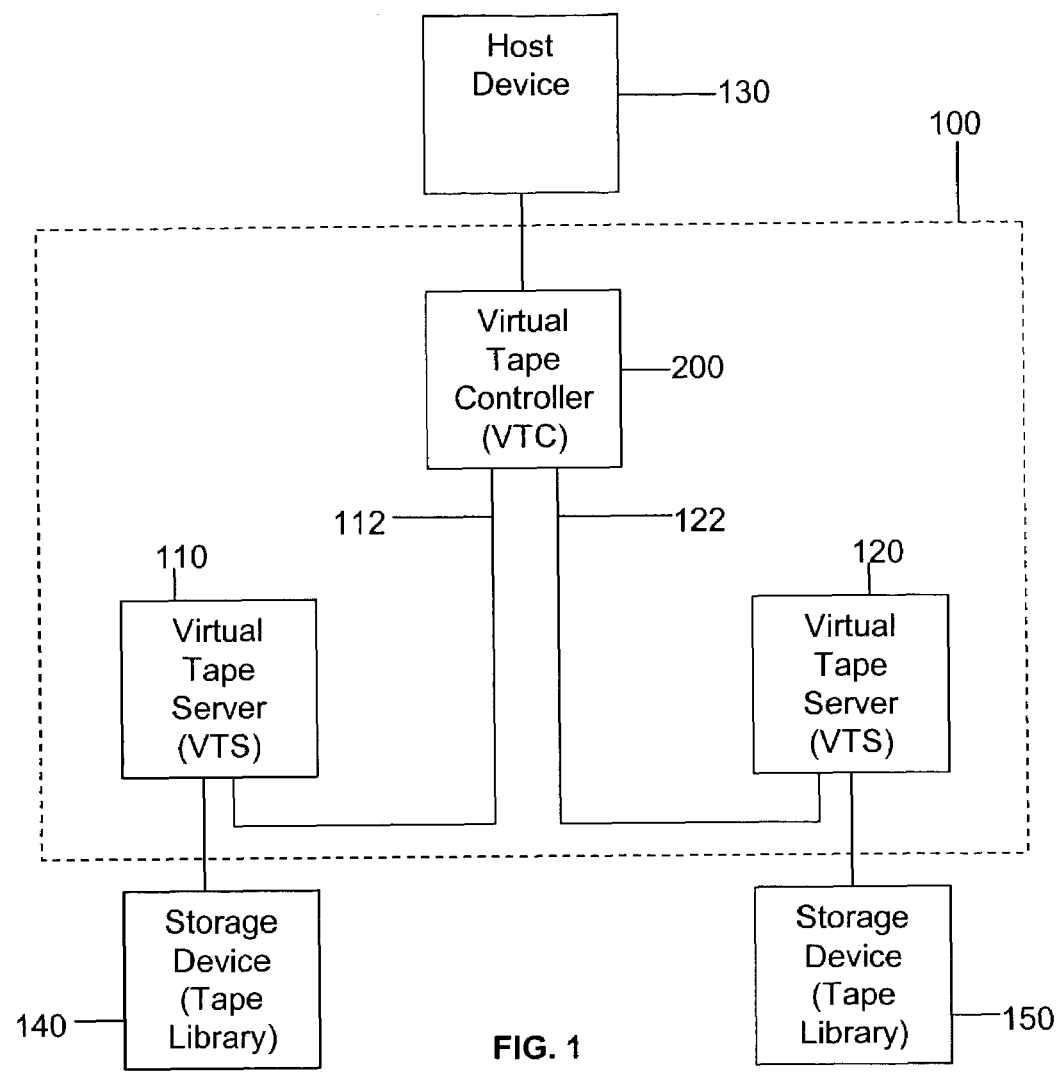
FIG. 1 is a block diagram of a storage system in which the present invention may be implemented.

FIG. 1 is a block diagram of a storage system 100 in which the present invention may be implemented. Although the embodiment illustrated and described herein is a tape storage system, the present invention may be implemented in other types of storage systems. The description herein of the present invention in the context of a tape storage system should not, therefore, be deemed as a limitation. The storage system 100 includes two or more virtual tape servers (VTSs) 110 and 120 attached to a virtual tape controller (VTC) 200 through communication links 112 and 122, respectively. The VTC 200 is also attached to a host device 130 while the VTSs 110 and 120 are also attached to storage devices, such as tape libraries 140 and 150, respectively.

Figure 2:
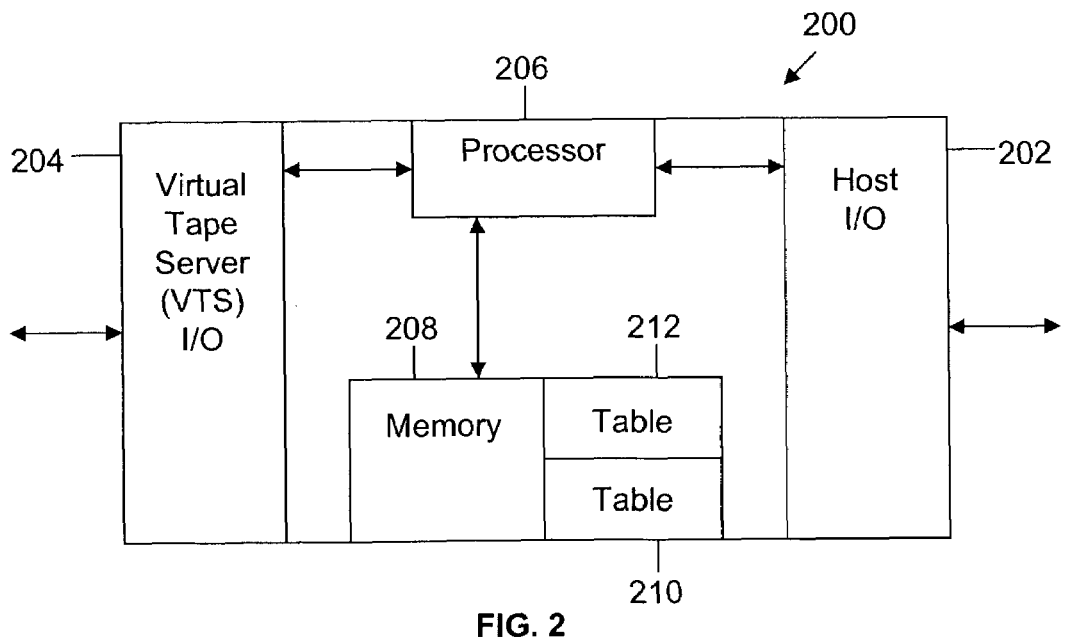
FIG. 2 is a block diagram of a virtual storage controller of the present invention.

Referring to FIG. 2, the VTC 200 includes a host interface 202, through which the host 130 attaches to the VTC 200, and a server interface 204, through which the VTSs 110 and 120 attach to the VTC 200. The VTC 200 further includes a processing unit or processor 206 and a memory unit 208. The processor 206 executes program instructions stored in the memory unit 208. As will be described below, the VTC 200 also includes one or two data tables 210 and 212; the tables 210 and 212 may reside in the memory unit 208 or in a separate portion of the VTC 200.

Depending upon system requirements and VTC to VTS distances, the communication links 112 and 122 may be ESCON, with or without dense wavelength division multiplexing ("DWDM"), or FICON and may also include channel extenders. Each of the various possible link characteristics is assigned a performance value, based upon the link's normal throughput relative to that of other possible links. Possible links with more favorable performance characteristics are assigned lower numbers or performance values than possible links with less favorable performance characteristics (although it will be appreciated that the scale could be reversed, with higher numbers representing more favorable performance). Possible links with comparable performance are assigned the same performance value. TABLE I provides an exemplary listing of possible link characteristics and corresponding performance values.

TABLE I

| LINK CHARACTERISTIC | PERFORMANCE VALUE |
| --- | --- |
| ESCON <5 km | 1 |
| FICON <30 km | 1 |
| FICON <80 km | 2 |
| ESCON <10 km | 2 |
| ESCON on DWDM <10 km | 3 |
| FICON <100 km | 3 |
| Channel Extender <1000 km | 3 |
| ESCON on DWDM <15 km | 4 |
| Channel Extender >1000 km | 4 |
| ESCON on DWDM >15 km | 5 |

In one embodiment, the contents of TABLE I, or its equivalent, are stored in the first data table 210 in the VTC 200. When the storage system 100 is first installed and configured, or when equipment is added or removed and the storage system 100 reconfigured, the actual characteristics of each existing or active (as opposed to possible) communication link between the VTC 200 and the VTSs 110 and 120 are stored in the second table 212. In an alternative embodiment employing a single storage table, the active links may each be assigned a performance value when the storage system 100 is configured or reconfigured. This information is then stored in the table 210 or 212.

Figure 3:
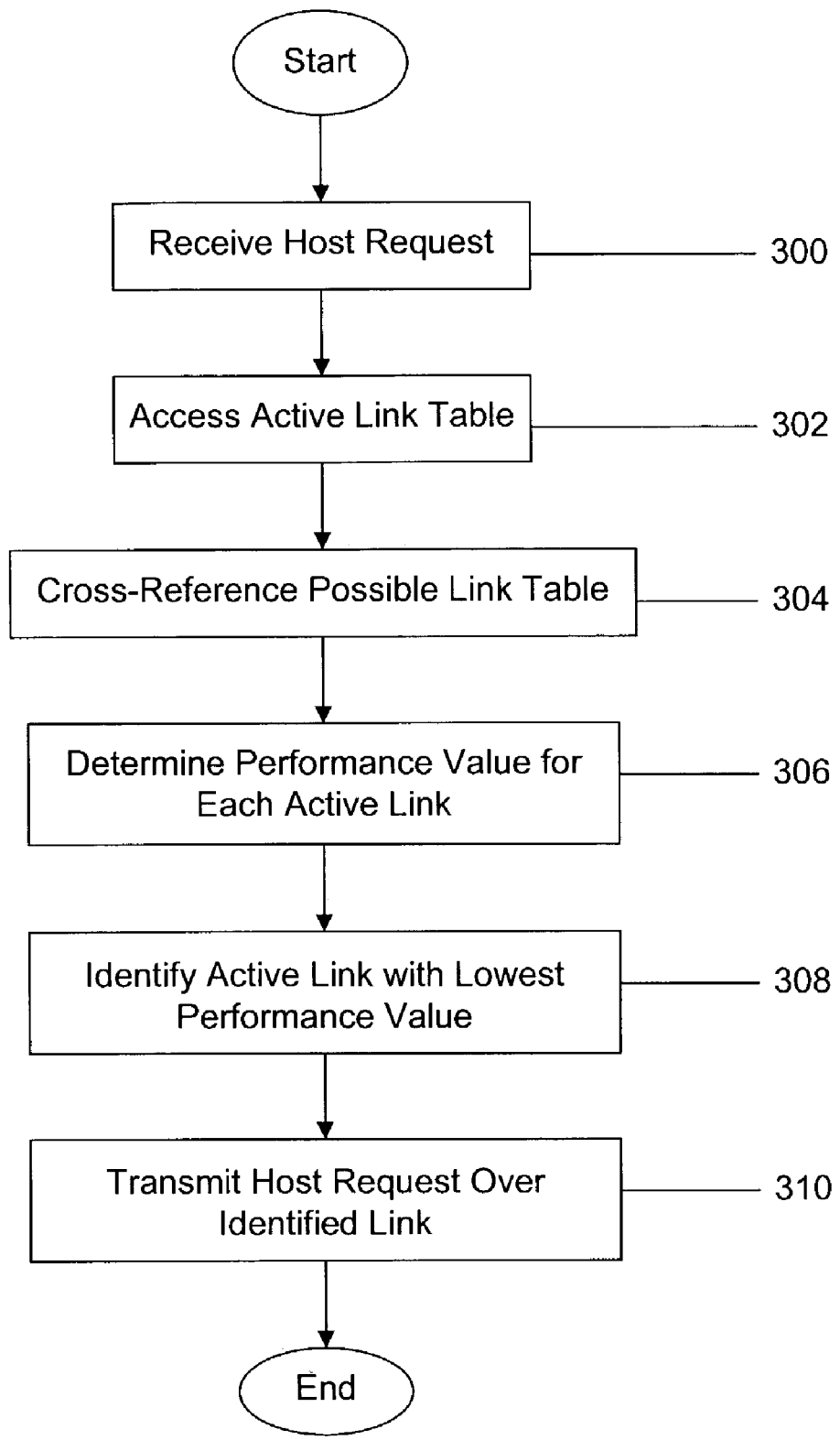
FIG. 3 is a flow chart of computer executable instructions of the present invention.

FIG. 3 is a flow chart of the operation of the present invention incorporated into the storage system 100. When a data operation is received from the host device 130 by the VTC 200 (step 300), the processor 206 accesses the second table 212 to determine what links are active and what their corresponding characteristics are (step 302). The information from the second table is cross-referenced with the first table 210 (step 304) and the performance value for each active link is determined (step 306). (In the alternative embodiment noted above, the single table is accessed.) The processor 206 then determines which of the two (or more, in other storage system configurations) active links 112 or 122 has the most favorable performance value (i.e., the lowest performance value) (step 308). The host request is subsequently directed to the VTS attached to the VTC 200 over such link.

The processor 206 may also be programmed to consider other factors in determining an active link's ultimate performance value. One such factor is the presence of requested data in a cache. If it is determined that the data to which the host request is directed is found in the cache of one of the VTSs, then, in order to give weight to the cache, the processor 206 may subtract a predetermined number from the associated link's performance value. For example, the presence of requested data in cache may be assigned a value of 2, which value is subtracted from the link's performance value (obtained from the first table 210) if the data is in cache. Thus, even though a link may originally have had a performance value higher than that of another link, the presence of requested data in cache may result in a more favorable performance value and the VTS attached to that link will be selected to perform the requested host operation. Similarly, when a preferred storage server has been identified, the attaching link's performance value may be reduced by another predetermined amount.

TABLE II provides the results of exemplary performance value determinations when the "in cache" factor has been assigned a value of two.

TABLE II

| Δ BETWEEN PERFORMANCE VALUES | "IN CACHE" PREFERENCE |
| --- | --- |
| 0 | Yes |
| 1 | Yes |
| 2 | Yes |
| 3 | No |
| 4 | No |
| 5 | No |

When the relevant data is in cache, the VTS in which it is located will be chosen if the difference (Δ) between the attaching link and another active link is less than or equal to two. However, if the difference is greater than two, then the other VTS will be chosen.

Additional, dynamic factors may also be considered by the processor 206 when determining the performance value for an active link. For example, the processor 206 may execute an algorithm to compare the workload or backlog of requests on the VTSs. A light backlog may be assigned a relatively high value (to be subtracted from the relevant link's performance value). As another example, the processor 206 may calculate each active link's throughput, such as by measuring the bit error rate (BER), and assign a value to be subtracted from a link's performance value. Is such a manner, a link which is beginning to fail (as evidenced by an increasing BER, perhaps due to a dirty or damaged ESCON cable) would receive fewer host requests, even though it may physically be the shortest link.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A storage controller, comprising:
   a host interface attachable to a host device;

a server interface attachable separately to a plurality of storage server devices through a plurality of corresponding active communications links;
a first stored table, comprising:
a list of possible characteristics of a link between the server interface and a storage server device; and
for each possible characteristic, a corresponding performance value;
a second stored table, comprising:
a list identifying the active links between the server interface and each storage server device; and
for each active link, a corresponding one of the performance characteristics; and
a processing unit, programmed to:
receive from the host a request for a storage operation on selected data;
for each active link, compare the corresponding link characteristic in the second table with the list of possible link characteristics in the first table;
for each active link, determine a corresponding performance value
cross-reference each active link in the second table with a performance value in the first table;
determine which active link has the most favorable performance value; and
direct that the requested storage operation be performed by the storage server device coupled to the storage controller over the active link with the most favorable performance value;
wherein:
an enterprise system connection link of less than a first distance has a first performance value;
an enterprise system connection link of less than a second distance has a second performance value;
an enterprise system connection on dense wavelength division multiplexing ("DWDM") link less than a third distance has a third performance value;
an enterprise system connection on DWDM link of less than a fourth distance has a fourth performance value;
an enterprise system connection on DWDM link of greater than the fourth distance has a fifth performance value;
a fiber connection link of less than a fifth distance has a performance value equal to the first performance value;
a fiber connection link of less than a sixth distance has a performance value equal to the second performance value;
a fiber connection link of greater than a sixth distance has a performance value equal to the third performance value;
a channel extender of less than a seventh distance has a performance value equal to the third performance value; and
a channel extender of greater than the seventh distance has a performance value equal to the fourth performance value.

2. The storage controller of claim 1, wherein the processing unit is further programmed to, prior to determining which active link has the most favorable performance value, subtract a first predetermined value from the performance value of an active link which is connected to a storage server device in which the selected data is stored in a cache.

3. The storage controller of claim 1, wherein the processing unit is further programmed to, prior to determining which active link has the most favorable performance value, subtract a second predetermined value from the performance value of an active link which is connected to a preferred storage server device.

4. The storage controller of claim 1, wherein the processing unit is further programmed to, prior to determining which active link has the most favorable performance value:
executing a workload balancing algorithm; and
factoring the result of the workload algorithm into the determination of which active link has the most favorable performance value.

5. The storage controller of claim 1, wherein the processing unit is further programmed to, prior to determining which active link has the most favorable performance value:
calculating a dynamic throughput value for each active link; and
factoring the throughput value into the determination of which active link has the most favorable performance value.

6. The storage controller of claim 5, wherein the throughput value is calculated from a bit error rate.

7. A storage system, comprising:
a plurality of storage devices;
a corresponding plurality of virtual storage servers coupled to the storage devices; and
a virtual storage controller, comprising:
a host interface attachable to a host device;
a server interface coupled separately to the plurality of virtual storage servers through a plurality of corresponding active communications links; and
a stored table, comprising:
a list of possible characteristics of a link between the server interface and a storage server device; and
for each possible characteristic, a corresponding performance value;
a second stored table, comprising:
a list identifying the active links between the server interface and each virtual storage server; and
for each active link, a corresponding one of the performance characteristics; and
a processing unit, programmed to:
receive from the host a request for a storage operation on selected data;
for each active link, compare the corresponding link characteristic in the second table with the list of possible link characteristics in the first table;
for each active link, determine a corresponding performance value;
cross-reference each active link in the second table with a performance value in the first table;
determine which active link has the most favorable performance value; and
direct that the requested storage operation be performed by the virtual storage server coupled to the virtual storage controller over the active link having the most favorable performance value;
wherein:
an enterprise system connection link of less than a first distance has a first performance value;
an enterprise system connection link of less than a second distance has a second performance value;
an enterprise system connection on dense wavelength division multiplexing ("DWDM") link less than a third distance has a third performance value;
an enterprise system connection on DWDM link of less than a fourth distance has a fourth performance value;

an enterprise system connection on DWDM link of greater than the fourth distance has a fifth performance value;

a fiber connection link of less than a fifth distance has a performance value equal to the first performance value;

a fiber connection link of less than a sixth distance has a performance value equal to the second performance value;

a fiber connection link of greater than a sixth distance has a performance value equal to the third performance value;

a channel extender of less than a seventh distance has a performance value equal to the third performance value; and a channel extender of greater than the seventh distance has a performance value equal to the fourth performance value.

8. The storage system of claim 7, wherein the processing unit is further programmed to, prior to determining which active link has the most favorable performance value, subtract a first predetermined value from the performance value of an active link which is connected to a virtual storage server in which the selected data is stored in a cache.

9. The storage system of claim 7, wherein the processing unit is further programmed to, prior to determining which active link has the most favorable performance value, subtract a second predetermined value from the performance value of an active link which is connected to a preferred virtual storage server.

10. The storage system of claim 7, wherein the processing unit is further programmed to, prior to determining which active link has the most favorable performance value:
executing a workload balancing algorithm; and
factoring the result of the workload algorithm into the determination of which active link has the most favorable performance value.

11. The storage system of claim 7, wherein the processing unit is further programmed to, prior to determining which active link has the most favorable performance value:
calculating a throughput value for each active link; and
factoring the throughput value into the determination of which active link has the most favorable performance value.

12. The storage system of claim 11, wherein the throughput value is calculated from a bit error rate.

13. The storage system of claim 7, wherein:
the storage devices comprise storage tape devices; and
the virtual storage servers comprise virtual tape servers.

14. The storage system of claim 13, wherein the storage tape devices comprise tape libraries.

15. A program storage device readable by a storage system controller coupled to a plurality of storage servers by corresponding active communications links, the program storage device tangibly embodying a program executable by the controller and comprising instructions for:
receiving from a host device coupled to the controller a request for a storage operation on selected data;
accessing a first stored table, comprising:
a list identifying the active links between the controller and each storage server; and
for each active link, a corresponding one of a plurality of possible characteristics;
cross-referencing each active link in the first table with a performance value in a second stored table, the second stored table comprising:
a list of plurality of the possible characteristics of a link between the server interface and a storage server device; and
for each possible characteristic, a corresponding performance value;
determining which active link has the most favorable performance value; and
directing that the requested storage operation be performed by the storage server coupled to the controller over the active link with the most favorable performance value;
wherein:
an enterprise system connection link of less than a first distance has a first performance value;
an enterprise system connection link of less than a second distance has a second performance value;
an enterprise system connection on dense wavelength division multiplexing ("DWDM") link less than a third distance has a third performance value;
an enterprise system connection on DWDM link of less than a fourth distance has a fourth performance value;
an enterprise system connection on DWDM link of greater than the fourth distance has a fifth performance value;
a fiber connection link of less than a fifth distance has a performance value equal to the first performance value;
a fiber connection link of less than a sixth distance has a performance value equal to the second performance value;
a fiber connection link of greater than a sixth distance has a performance value equal to the third performance value;
a channel extender of less than a seventh distance has a performance value equal to the third performance value; and
a channel extender of greater than the seventh distance has a performance value equal to the fourth performance value.

16. The program storage device of claim 15, wherein the program further comprises instructions for, prior to determining which active link has the most favorable performance value, subtracting a first predetermined value from the performance value of an active link which is connected to a storage server device in which the selected data is stored in a cache.

17. The program storage device of claim 15, wherein the program further comprises instructions for, prior to determining which active link has the most favorable performance value, subtracting a second predetermined value from the performance value of an active link which is connected to a preferred storage server device.

* * * * *